United States Patent
Zhao et al.

(10) Patent No.: US 8,649,515 B1
(45) Date of Patent: Feb. 11, 2014

(54) CONTROLLED SHARING OF MEDIA DATA THAT ARE RETRIEVABLE OVER A PUBLIC COMPUTER NETWORK

(75) Inventors: Xiaoming Zhao, Jiangsu (CN); Gang Chen, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 794 days.

(21) Appl. No.: 12/702,160

(22) Filed: Feb. 8, 2010

(51) Int. Cl.
*H04N 7/167* (2011.01)

(52) U.S. Cl.
USPC ............. 380/202; 713/171; 713/176; 726/33; 726/27; 705/319

(58) Field of Classification Search
None
See application file for complete search history.

(56) References Cited

U.S. PATENT DOCUMENTS

| | | | |
|---|---|---|---|
| 7,325,127 B2 * | 1/2008 | Olkin et al. | 713/152 |
| 7,627,892 B2 * | 12/2009 | Lin et al. | 726/2 |
| 7,716,288 B2 * | 5/2010 | Graham et al. | 709/206 |
| 2002/0099837 A1 * | 7/2002 | Oe et al. | 709/229 |
| 2003/0200105 A1 * | 10/2003 | Borden et al. | 705/1 |
| 2004/0205330 A1 * | 10/2004 | Godfrey et al. | 713/150 |
| 2008/0306974 A1 * | 12/2008 | Van Steenbergen et al. | 707/100 |

OTHER PUBLICATIONS

Tootoonchian et al., "Lockr: Better Privacy for Social Networks," CoNEXT, Dec. 1-4, 2009, all pages.*
Session Key—Wikipedia, the free encyclopedia, 1 page [retrieved on Jan. 14, 2010], retrieved from the internet: http://en.wikipedia.org/wiki/Session_key.
ID-based cryptography—Wikipedia, the free encyclopedia, 1 page [retrieved on Jan. 14, 2010], retrieved from the internet: http://en.wikipedia.org/wiki/ID-based_cryptography.
Digital watermarking—Wikipedia, the free encyclopedia, 5 pages [retrieved on Jan. 14, 2010], retrieved from the internet: http://en.wikipedia.org/wiki/Digital_watermarking.
Public-key cryptography—Wikipedia, the free encyclopedia, 11 pages [retrieved on Jan. 14, 2010], retrieved from the internet: http://en.wikipedia.org/wiki/Public-key_cryptography.
Dan Boneh, et al. "Identity-Based Encryption from the Weil Pairing", 31 pages [retrieved on Jan. 14, 2010], retrieved from the internet: http://crypto.stanford.edu/~dabo/papers/ibe.pdf.

* cited by examiner

*Primary Examiner* — Nadia Khoshnoodi
(74) *Attorney, Agent, or Firm* — Okamoto & Benedicto LLP

(57) ABSTRACT

An owner of media data encrypts the media data using a session key. The session key is encrypted using a public key of a designated recipient of the media data. A key manager provides the encrypted session key to the recipient while the owner is sharing the media data with the recipient. The encrypted media data is published and accessed by the recipient over a public computer network. The encrypted session key and the encrypted media data are received in the recipient's computer, where the encrypted session key is decrypted into the session key using the recipient's private key and the encrypted media data is decrypted into the media data using the session key. When the owner is no longer sharing the media data with the recipient, the recipient is prevented from further receiving the encrypted session key from the key manager.

11 Claims, 6 Drawing Sheets

CONTROLLED SHARING OF MEDIA DATA THAT ARE RETRIEVABLE OVER A PUBLIC COMPUTER NETWORK

BACKGROUND OF THE INVENTION

1. Field of the Invention

The present invention relates generally to computer security, and more particularly but not exclusively to methods and apparatus for controlled sharing of media data.

2. Description of the Background Art

A public computer network, such as the Internet, encourages information exchange and collaboration among computer users. On the Internet, for example, Web 2.0, cloud computing, media sharing (e.g., Flickr™ website), and social networking (e.g., Facebook™ website), allow users to store media data on a public server computer for access by friends and other users. As a particular example, a user may store vacation photos on a photo sharing website for viewing by family members, friends, and colleagues. While public storage and access have undeniable benefits, a user loses control over his media data once it is published. In the photo sharing example, those who were given access to the photos can keep copies for further distribution to other people. Furthermore, when the user deletes his photos from the website, it is possible for the website to keep copies of the photos or not actually delete the photos from storage devices.

SUMMARY

In one embodiment, an owner of media data encrypts the media data using a session key. The session key is encrypted using a public key of a designated recipient of the media data. A key manager provides the encrypted session key to the recipient while the owner is sharing the media data with the recipient. The encrypted media data is published and accessed by the recipient over a public computer network. The encrypted session key and the encrypted media data are received in the recipient's computer, where the encrypted session key is decrypted into the session key using the recipient's private key and the encrypted media data is decrypted into the media data using the session key. A client side logic configured to render the media data in the recipient's computer allows viewing or playing of the media data, but prevents copying and storage of the media data in the recipient's computer. When the owner is no longer sharing the media data with the recipient, the client side logic is prevented from further receiving the encrypted session key from the key manager.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
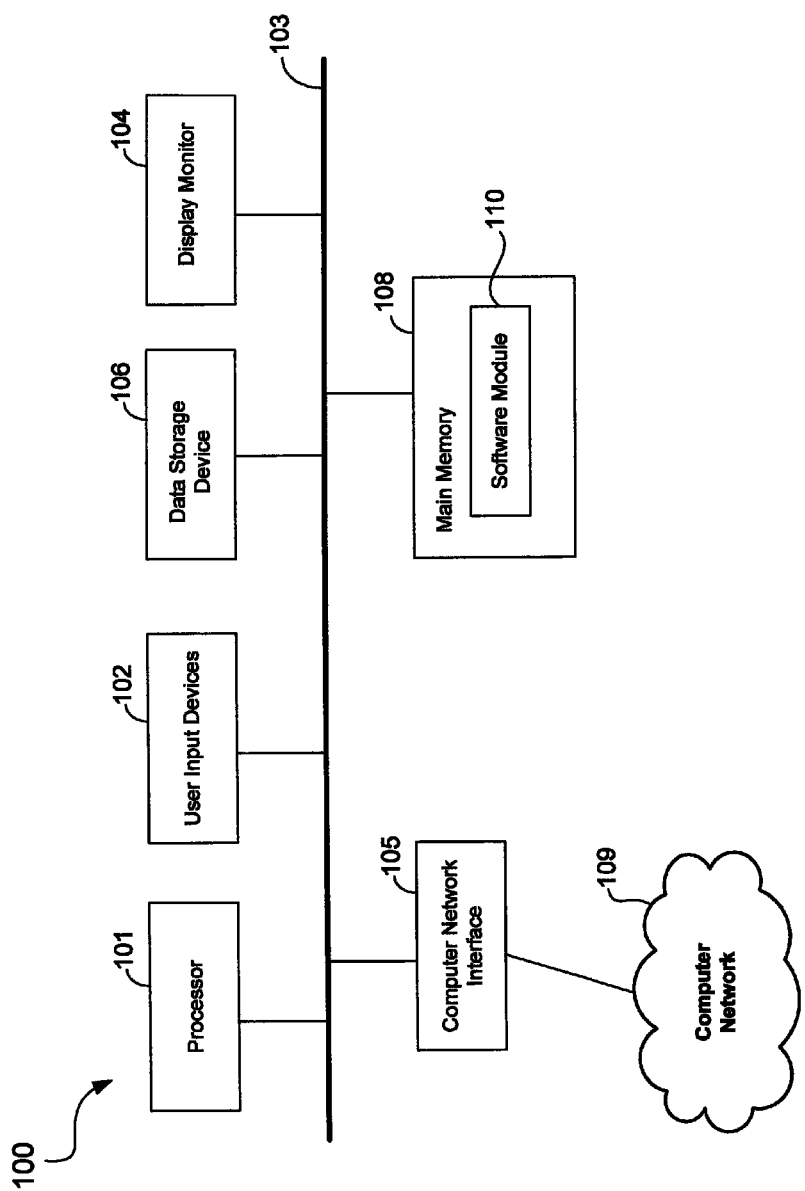
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer (e.g., FIG. 2, client computer 220 or 250) or server computer (e.g., server computer 231), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110, which comprise computer-readable program code components of the client computer 100. The software modules 110 may be loaded from the data storage device 106 to the main memory 108 for execution by the processor 101.

Figure 2:
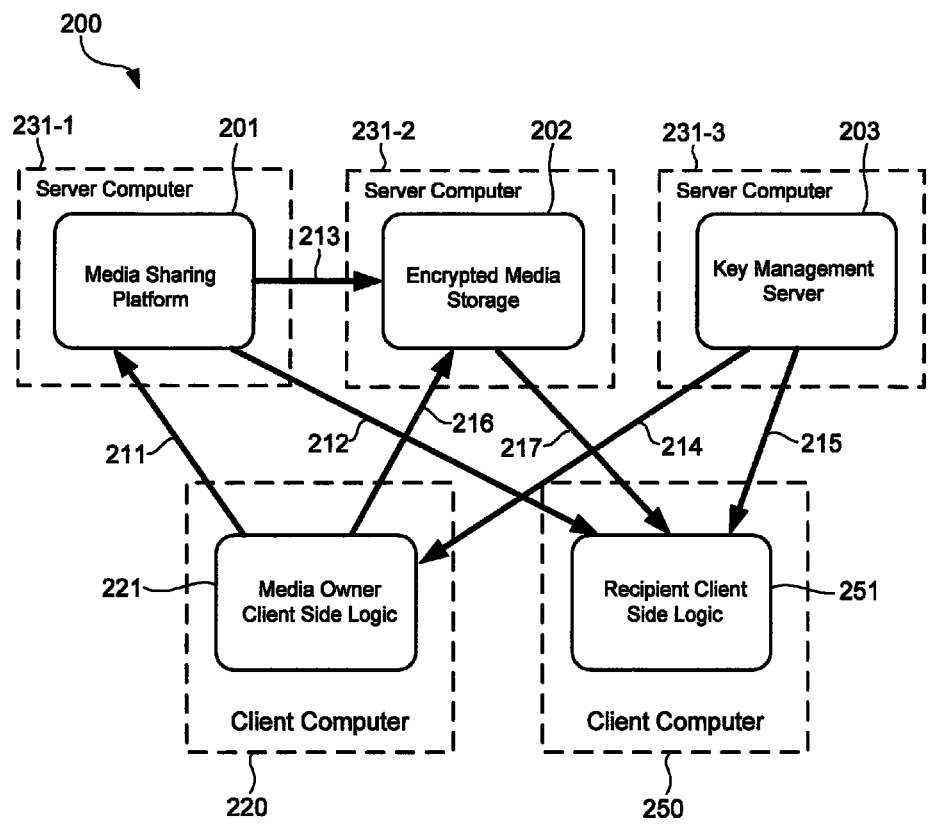
FIG. 2 schematically shows a computer network for controlling access to shared media data in accordance with an embodiment of the present invention.

FIG. 2 schematically shows a computer network 200 in accordance with an embodiment of the present invention. In the example of FIG. 2, the computer network 200 includes server computers 231 (i.e., 231-1, 231-2, and 231-3) and client computers 220 and 250. In one embodiment, the computers of the network 200 communicate over the Internet. The server computers 231 are shown separately, but may be implemented by a single computer or multiple computers. For example, the server computer 231-1 may comprise several collaborative computers. As another example, the functionality of the server computers 231-2 and 231-3 may be combined into one or more computers.

In the example of FIG. 2, the server computer 231-1 provides a media sharing platform. As used herein, "media" may include photos, music, art work, graphics, charts, engineering drawings, scans and other non-text data.

The client computers 220 and 250 may comprise a desktop computer, laptop computer, or other computing device.

In the example of FIG. 2, the client computer 220 includes a media owner client side logic 221. The owner client side logic 221 may comprise computer-readable program code for encrypting media data into encrypted media data, publishing the encrypted media data over the Internet, and encrypting a session key that is used for decrypting the encrypted media data. In one embodiment, the owner client side logic 221 uses an identity-based encryption scheme to encrypt the session key. For example, the owner client side logic 221 may use an identity-based encryption scheme to encrypt the session key into encrypted session key using a public key of a recipient with whom the media owner wants to share the media data. The owner client side logic 221 may be configured to provide the encrypted session key to a key management server 203, which in turn is configured to provide the encrypted session key to one or more recipients. When the owner wants to prevent a recipient from further access to the media data, the owner client side logic 221 may be configured to instruct the key management server 203 to prevent that recipient from further receiving the encrypted session key.

In the example of FIG. 2, the client computer 250 includes a recipient client side logic 251. The recipient client side logic 251 may comprise computer-readable program code for allowing a recipient to view or play media data published by the media owner. In one embodiment, the recipient client side logic 221 is configured to download the encrypted session key from the key management server 203, decrypt the encrypted session key into the session key using the recipient's private key, download the encrypted media data, and decrypt the encrypted media data into the media data using the session key. The recipient client side logic 221 may be configured to download the encrypted session key from the key management server 203 each time the encrypted media data is to be decrypted into the media data for rendering (i.e., displaying or viewing). This prevents the encrypted media data from being decrypted when the key management server 203 no longer provides the session key.

In one embodiment, the recipient client side logic 251 is integrated into a web page by way of embedded objects, such as flash components, ActiveX control, or Java applet, for example. For example, instead of viewing the media data directly on a web page, the media data is displayed by a flash component that renders the media data with the same look and feel as directly embedded media. To control access to the media data, the media data is not directly embedded in the web page. In one embodiment, the recipient client side logic 251 is configured to prevent storage or hard printing of the media data on a local computer. For example, the recipient client side logic 251 may prevent a recipient from saving the media data on the client computer 250. This prevents the recipient from viewing/playing encrypted media data without the corresponding session key. For example, the media data may be rendered by a flash component that disables hard copy printing and copying of the media data. The media data may include a digital signature, such as a watermark, to allow for tracing and identification of the media data in the event the recipient performs a screen copy directly off the display screen or some other workaround. The digital signature may indicate the recipient of the media data to allow for identification on who further distributed the media data.

The media sharing platform 201 may comprise a media sharing website or social networking website hosted by the server computer 231-1. For example, the media sharing platform 201 may comprise a photo-sharing website or a social networking website that allows the owner to upload or link to the media data for sharing with a recipient.

The key management server 203, which is hosted on the server computer 231-3, may comprise a server for storing encrypted session keys for encrypted media data and for generating private-public key pairs for encryption/decryption of session keys. When using identity-based encryption, the key management server 203 may generate and provide private keys to users; a user can generate another user's public key from that user's identity. In the example of FIG. 2, users may register with the key management server 203 to receive their private keys and other users' public key (arrows 214 and 215). The media owner may encrypt media data into encrypted media data using a session key prior to sharing the media data with a recipient. The owner may encrypt the session key into encrypted session key using that recipient's public key. The key management server 203 may be configured to provide encrypted session keys to recipients so long as the owner is sharing media data with them.

The encrypted media storage 202 on the server computer 231-2 may comprise data storage accessible over the Internet. The encrypted media storage 202 is configured to store encrypted media data. In the example of FIG. 2, the owner forwards encrypted media data to the encrypted media storage 202 for storage (arrow 216). The owner informs the recipients of the availability of the encrypted media data by posting on the media sharing platform 201 (arrow 211), which provides a reference or link to the encrypted media data stored in the encrypted media storage 202 (arrow 213). A recipient using a client computer 250 learns of the availability of the encrypted media data from the media sharing platform 201 (arrow 212), and follows the reference on the media sharing platform 201 to receive the encrypted media data from the encrypted media storage 202 (arrow 217). The recipient uses his private key to decrypt the encrypted session key into the session key, and uses the session key to decrypt the encrypted media data into the media data.

For ease of identification, the encrypted media storage 202 may store not only the encrypted media but also its description, such as text, metadata, tags, thumbnail, and other identifying information. The encrypted media storage 202 may also store a recipient client side logic 251 for download to a client computer along with the encrypted media data.

Figure 3:
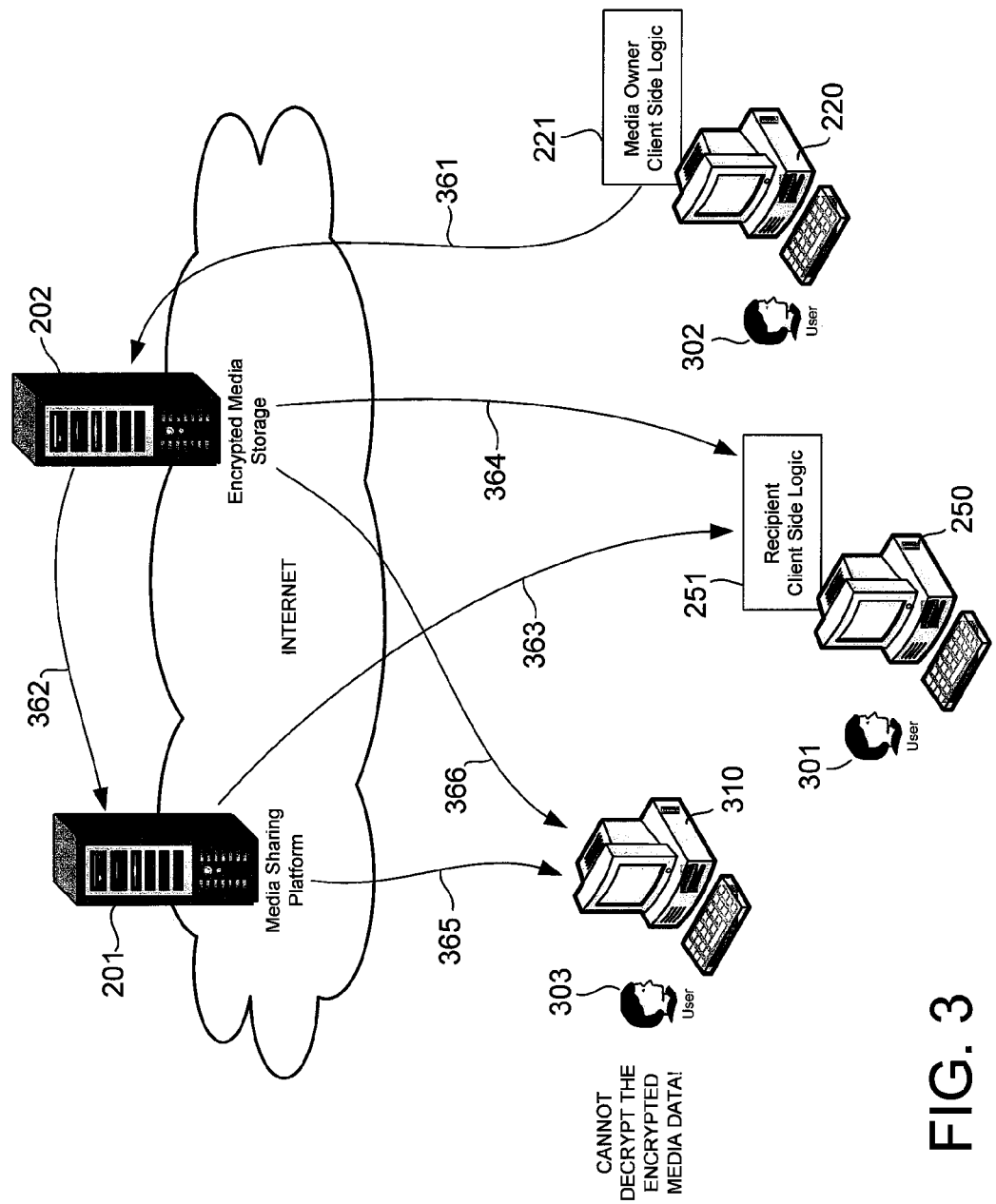
FIG. 3 shows a flow diagram schematically illustrating operation of a computer network for controlled sharing of media data in accordance with an embodiment of the present invention.

FIG. 3 shows a flow diagram schematically illustrating operation of a computer network for controlled sharing of media data in accordance with an embodiment of the present invention. FIG. 3 is explained using the components of the network 200 for illustration purposes only.

In the example of FIG. 3, a user 302 is an owner of media data. The user 302 wants to share the media data with a user 301, who is a designated recipient of the media data. The user 302 employs a client computer 220, on which memory a media owner client side logic 221 is loaded for execution by a processor of the client computer 220. Similarly, the user 301 employs a client computer 250, on which memory a recipient client side logic 251 is loaded for execution by a processor of the client computer 250. A user 303 employs a computer 310 to connect to the Internet. However, the user 303 is not a designated recipient of the media data owned by the user 302. That is, the owner does not want to share the media data with the user 303.

In the example of FIG. 3, the client computer 250, the client computer 220, the client computer 310, the media sharing platform 201, and the encrypted media storage 202 communicate over the Internet. FIG. 3 does not show the use of the key management server 203 for clarity of illustration. The key management server 203 is further discussed in FIGS. 4-6.

In operation, the media owner client side logic 221 encrypts the media data and forwards the encrypted media data to the encrypted media storage 202, where the encrypted media data is stored (arrow 361). In the example of FIG. 3, the recipient client side logic 251 comprises a flash component that is stored in the encrypted media storage 202 along with the encrypted media data. The encrypted media storage 202 publishes a link to the recipient client side logic 251 and the encrypted media data (arrow 362). For example, the link may be accessible from a web page of the media sharing platform 201. The user 301 navigates to the media sharing platform 201 to find the web page containing the link (arrow 363), and follows the link to receive the recipient client side logic 251 and the encrypted media data. The recipient client side logic 251 runs in the computer 250 of the user 301 and retrieves the encrypted media from the encrypted media storage 202 (arrow 364). The recipient client side logic 251 decrypts the encrypted media data, and renders the encrypted media in the client computer 250.

The user 303 is not a designated recipient of the media data. Accordingly, the user 303 is not provided the key needed to decrypt the encrypted media data. In particular, even when the user 303 visits the media sharing platform 201 to get the web page that has the link (arrow 365) and follows the link to retrieve the encrypted media data and the recipient client side logic 251 (arrow 366), the user 303 will still not be able to decrypt the encrypted media. This allows the user 302 to control who can access the media data, allowing him to privately share the media data only with designated recipients. This also prevents the media sharing platform 201 or encrypted storage media 202 from accessing the media data without permission from the user 302.

Figure 4:
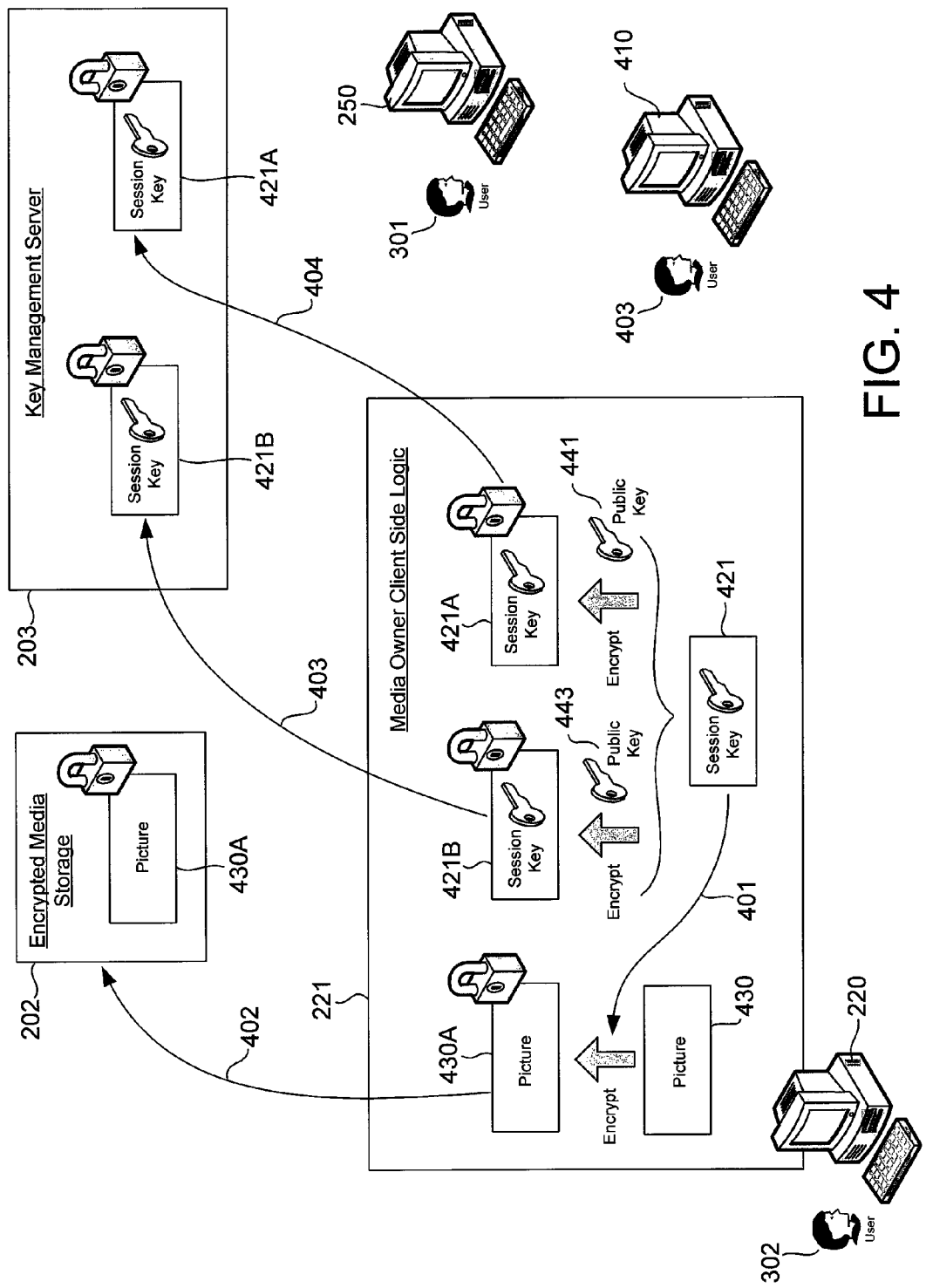
FIGS. 4-6 show flow diagrams schematically illustrating operation of a computer network for controlled sharing of media data in accordance with an embodiment of the present invention.
Figure 5:
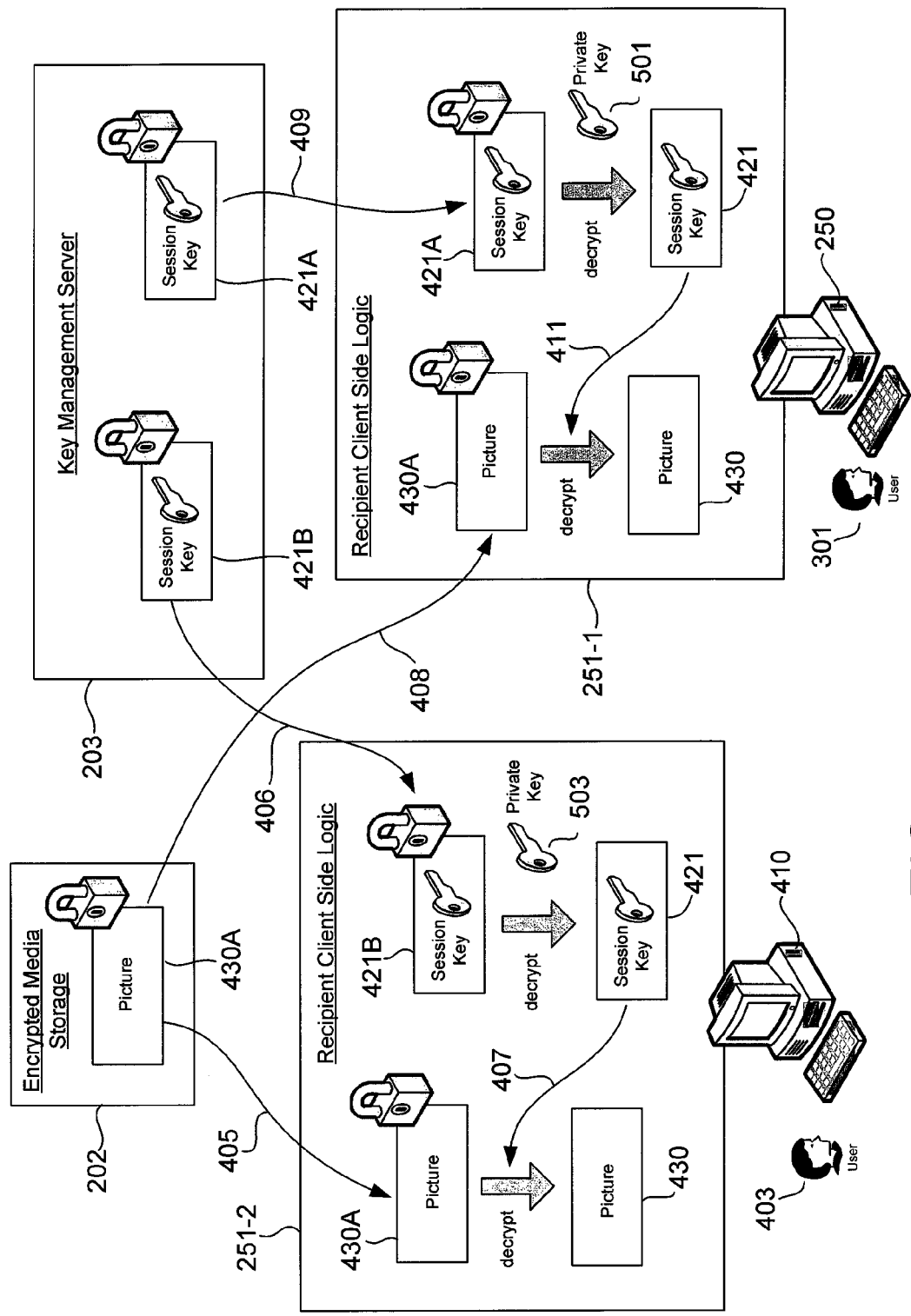
Figure 6:
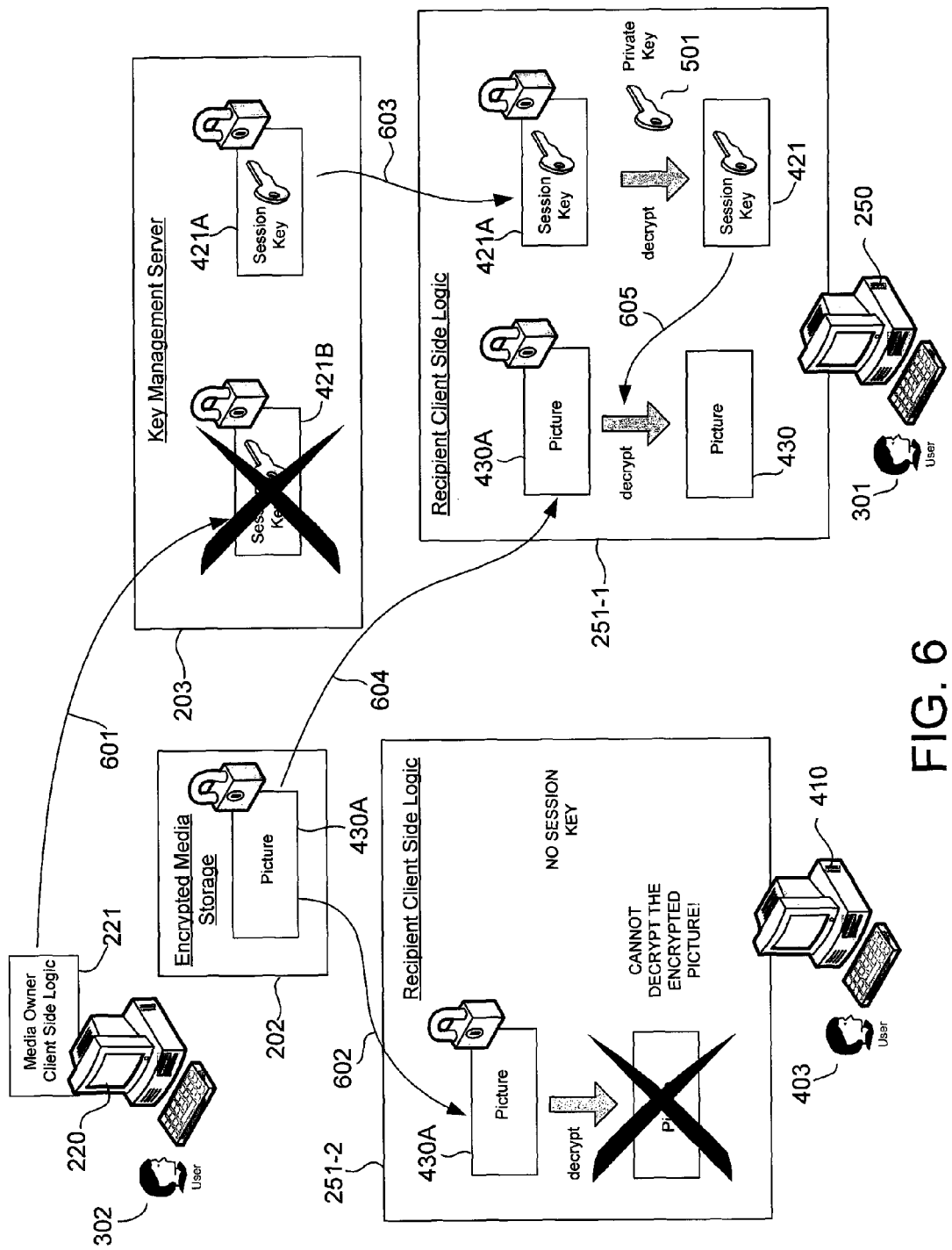

FIGS. 4-6 show flow diagrams schematically illustrating operation of a computer network for controlled sharing of media data in accordance with an embodiment of the present invention. FIGS. 4-6 are explained using the components of the network 200 for illustration purposes only.

In the example of FIG. 4, the user 302 wants to share media data comprising a picture 430 (e.g., digital photos) with users 301 and 403, who are the designated recipients. The user 301 employs the computer 250, while the user 403 employs the computer 410. The users 302, 301, and 403 registered with the key management server 203 to receive public-private key pairs. The user 302 has received from the key management server 203 the public key 443 of the user 403 and the public key 441 of the user 301. The public key 443 and a private key 503 (see FIG. 5) of the user 403 form an asymmetric encryption key pair. Similarly, the public key 441 and a private key 501 (see FIG. 5) of the user 301 form an asymmetric encryption key pair. In one embodiment, the asymmetric encryption scheme is identity based. For example, the public keys 443 and 441 may be generated based on the email addresses of the users 403 and 301, respectively.

The media owner client side logic 221 runs on the computer 220 employed by the user 302. The owner client side logic 221 randomly generates a session key 421 using a symmetric encryption algorithm, such as Advanced Encryption Standard (AES). The owner client side logic 221 uses the session key 421 to encrypt the picture 430 into an encrypted picture 430A (arrow 401). The owner client side logic 221 forwards the encrypted picture 430A to the encrypted media storage 202 for storage (arrow 402). The owner client side logic 221 encrypts the session key 421 into an encrypted session key 421B using the public key 443 of the user 403. Similarly, the owner client side logic 221 encrypts the session key 421 into an encrypted session key 421A using the public key 441 of the user 301. In general, the owner client side logic 221 may repeat this encryption of the session key for each designated recipient with whom the owner wants to share his media data. The owner client side logic 221 forwards the session key 421B (arrow 403) and the session key 421A (arrow 404) to the key management server 203.

FIG. 5 continues from FIG. 4. In the example of FIG. 5, the users 403 and 301 learn of the existence of the encrypted picture 430A from the media sharing platform 201 (see FIG. 2), an email, or other communication from the user 302. The users 403 and 301 may obtain a recipient client side logic 251 (i.e., 251-1, 251-2) from the encrypted media storage 202 by following a link on a web page hosted by the media sharing platform 201 or included in an email, to name some examples. In general, a user may obtain a recipient client side logic 251 from a computer other than the encrypted media storage 202, from removable computer-readable storage media (e.g., CD-ROM, memory stick), or from other sources.

In the case of the user 403, the recipient client side logic 251-2 downloads the encrypted picture 430A from the encrypted media storage 202 to the client computer 410 (arrow 405). The recipient client side logic 251-2 also downloads the encrypted session key 421B from the key management server 203 to the client computer 410 (arrow 406), and uses the private key 503 of the user 403 to decrypt the encrypted picture 430A back into the picture 430 (arrow 407). The recipient client side logic 251-2 renders the picture 430 for viewing by the user 403 on the client computer 410.

In the case of the user 301, the recipient client side logic 251-1 downloads the encrypted picture 430A from the encrypted media storage 202 to the client computer 250 (arrow 408). The recipient client side logic 251-1 also downloads the encrypted session key 421A from the key management server 203 to the client computer 250 (arrow 409), and uses the private key 501 of the user 301 to decrypt the encrypted picture 430A back into the picture 430 (arrow 411). The recipient client side logic 251-1 renders the picture 430 for viewing by the user 301 on the client computer 250.

A recipient client side logic 251 renders the picture 430 but prevents its storage or hard printing. As a result, the users 403 and 301 will have to decrypt the encrypted picture 430A for each session of viewing the picture 430. In one embodiment, the recipient client side logic 251 is configured to obtain the session key 421 from the key management server 203 for each viewing session. This allows the user 302 to have the option to prevent a user who previously received the picture 430 from further viewing it in the future.

FIG. 6 continues from FIG. 5. In the example of FIG. 6, the user 302 decides to stop sharing the picture 430 with the user 403. At that point, the user 403 is no longer a designated recipient of the picture 430. To accomplish this, the user 302 uses the media owner client side logic 221 to inform the key management server 203 to stop allowing download of the session key 421B (arrow 601). For example, the owner client side logic 221 may simply delete the encrypted session key 421B from the key management server 203. As another example, the key management server 203 may include a granted list for the encrypted session keys 421A and 421B, and only those users on the granted list can download the session keys. The owner client side logic 221 may be used to maintain the granted list by adding and removing users from the granted list. To remove the user 403, the user 403 is removed from the granted list. So the next time the user 403 logs onto the key management server 203 and attempt to download the encrypted session key 421B, he will be prevented from doing so.

In a following session to view the picture 430, the recipient client side logic 251-2 is still able to download the encrypted picture 430A from the encrypted media storage 202 (arrow 602). However, this time, the encrypted session key 421B is no longer available for download, preventing decryption of the encrypted picture 430A on the client computer 410. This prevents the user 403 from viewing the picture 430.

Because the user 301 is still a recipient, the encrypted session key 421A remains available for download from the key management server 203 to the client computer 250 (arrow 603). As before, the recipient client side logic 251-1 retrieves the encrypted picture 430A from the encrypted media storage 202 (arrow 604), decrypts the encrypted session key 421A into the session key 421, and uses the session key 421 to decrypt the encrypted picture 430A into the picture 430 (arrow 605). The recipient client side logic 251-1 renders the picture 430 for viewing by the user 301.

Computer networks and methods for controlled sharing of media data have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method for controlled sharing of media data, the method comprising:
    adding a digital signature to a media data;
    encrypting the media data into an encrypted media data using a session key, the media data to be shared by an owner of the media data with a first user and a second user;
    encrypting the session key into a first encrypted session key by using a public key of the first user;
    encrypting the session key into a second encrypted session key using a public key of the second user;
    providing the encrypted media data from an encrypted media storage to a first client computer employed by the first user and to a second client computer employed by the second user by way of a web page hosted by a media sharing platform;
    decrypting the first encrypted session key back into the session key using a first private key of the first user, the first public key and the first private key forming an asymmetric key pair;
    decrypting the encrypted media data using the session key in the first client computer employed by the first user to receive the encrypted media data and the first encrypted session key;
    rendering the media data in the first client computer;
    decrypting the second encrypted session key back into the session key using a second private key of the second user, the second public key and the second private key forming an asymmetric key pair;
    decrypting the encrypted media data using the session key in the second client computer employed by the second user to receive the encrypted media data and the second encrypted session key;
    rendering the media data in the second client computer;
    in response to an instruction from an owner of the media data to stop sharing the media data with the first user but not with the second user, preventing the first client computer from further receiving the first encrypted session key while continually allowing the second client computer to receive the second encrypted session key.

2. The method of claim 1 wherein preventing the first client computer from further receiving the first encrypted session key comprises deleting the first encrypted session key from a key management server that provided the first encrypted session key to the first client computer.

3. The method of claim 1 wherein the first encrypted session key is received by the first client computer from a key management server.

4. The method of claim 1 wherein the media data comprises a picture.

5. A computer network comprising:
    a first client computer employed by a first user with whom an owner of media data wants to share the media data, the first client computer including a first key for decrypting a first encrypted session key into a session key, the session key being for decrypting an encrypted media data into the media data;
    a second client computer employed by a second user with whom the owner of media data wants to share the media data, the second client computer including a second key for decrypting a second encrypted session key into the session key;
    an owner client computer employed by the owner of the media data, the owner client computer being configured to encrypt the media data into the encrypted media data and to forward the encrypted media data for storage in an encrypted media storage configured to store the encrypted media data;
    a media sharing platform hosting a web page that allows access to the encrypted media data; and
    a key management server configured to store the first encrypted session key for distribution to the first client computer so long as the owner of the media data is sharing the media data with the first user, to store the second encrypted session key for distribution to the second client computer so long as the owner of the media data is sharing the media data with the second user, and to stop providing the first encrypted session key to the first client computer while continually allowing the second client computer to receive the second encrypted session key in response to receiving an instruction from the media owner to stop sharing the media data with the first user but not with the second user.

6. The computer network of claim 5 wherein the web page includes a link to the encrypted media data in the encrypted media storage.

7. A computer-implemented method for controlled sharing of media data, the method comprising:
    encrypting a media data into encrypted media data;
    encrypting a session key into a first encrypted session key and a second encrypted session key;
    indicating on a web page hosted by a media sharing platform an availability of the encrypted media data;
    receiving the encrypted media data and the first encrypted session key in a first recipient client computer over a computer network, the first recipient client computer being employed by a first recipient with whom an owner of the media data is sharing the media data;
    decrypting the encrypted session key into the session key and the encrypted media data into the media data in the first recipient client computer, the encrypted media data being decrypted using the session key;
    and
    preventing further decryption of the first encrypted session key in the first recipient client computer while continually allowing decryption of the second encrypted session key in a second recipient client computer employed by a second recipient in response to receiving an instruction from the owner of the media data to stop sharing the media data with the first recipient but not with the second recipient.

8. The method of claim 7 wherein preventing further decryption of the encrypted session key in the first recipient client computer comprises:
   deleting the first encrypted session key from a first server computer that provided the first encrypted session key to the first recipient client computer.

9. The method of claim 7 wherein the first recipient client computer receives the encrypted media by following a link on the web page hosted by the media sharing platform.

10. The method of claim 7 wherein the first encrypted session key is encrypted using a public key of the first recipient.

11. The method of claim 7 wherein the first encrypted session key is decrypted in the first recipient client computer using a private key of the first recipient.

* * * * *